(12) United States Patent
Taroni et al.

(10) Patent No.: US 11,072,047 B1
(45) Date of Patent: Jul. 27, 2021

(54) SUPPORT DEVICE, MACHINE TOOL AND METHOD FOR SUPPORTING A ROD-SHAPED WORKPIECE

(71) Applicant: BYSTRONIC LASER AG, Niederönz (CH)

(72) Inventors: Davide Taroni, Carate Urio (IT); Luca Fontana, Ospitaletto (IT); Andrea Guerra, Concesio (IT)

(73) Assignee: BYSTRONIC LASER AG, Niederoenz (CH)

( * ) Notice: Subject to any disclaimer, the term of this patent is extended or adjusted under 35 U.S.C. 154(b) by 0 days.

(21) Appl. No.: 17/267,946

(22) PCT Filed: Jun. 2, 2020

(86) PCT No.: PCT/EP2020/000111
§ 371 (c)(1),
(2) Date: Feb. 11, 2021

(87) PCT Pub. No.: WO2020/244799
PCT Pub. Date: Dec. 10, 2020

(30) Foreign Application Priority Data

Jun. 6, 2019 (EP) ..................................... 19178877

(51) Int. Cl.
*B23Q 1/76* (2006.01)
(52) U.S. Cl.
CPC ..................................... *B23Q 1/76* (2013.01)
(58) Field of Classification Search
CPC .... B23B 13/126; B23K 37/0417; B23Q 1/25; B23Q 1/72; B23Q 1/76; B23Q 1/763;
(Continued)

(56) References Cited

U.S. PATENT DOCUMENTS

| 8,404,997 B2 * | 3/2013 | Dilger | B23Q 1/76 |
| | | | 219/121.67 |
| 2004/0164062 A1 * | 8/2004 | Horisberger | B23K 26/1488 |
| | | | 219/121.82 |

(Continued)

FOREIGN PATENT DOCUMENTS

| EP | 0574882 A1 * | 12/1993 | ............. B23B 13/02 |
| EP | 0574882 A1 | 12/1993 | |

(Continued)

OTHER PUBLICATIONS

International Search Report and Written Opinion, dated Oct. 6, 2020, for PCT/EP2020/000111, filed Jun. 2, 2020.

*Primary Examiner* — Tyrone V Hall, Jr.
(74) *Attorney, Agent, or Firm* — Workman Nydegger

(57) ABSTRACT

The invention relates to a support device (200) for supporting a rod-shaped workpiece (110) for a machine tool (100) along a longitudinal axis (L) of a support area (220). The support device (200) comprises at least one twin support (210) adapted to support a section of the workpiece (110) in the support area (220), wherein the twin support (210) comprises two support elements (300, 310) each being rotatable around a rotational axis (R1, R2), wherein each of the rotational axes (R1, R2) is perpendicular to the longitudinal axis (L), wherein each support element (300, 310) comprises a quadrant shaped support surface (330) forming together a semicircular shaped support surface (340) adapted for supporting a section of the workpiece (110), wherein the support area (220) comprises an open side opposed to the semicircular shaped support surface (340), and wherein the support elements (300, 310) are adapted to provide a varying diameter of the semicircular shaped support surface (340) based upon the position of rotation around the rotational axis (R1, R2) in order to support varying workpieces (110).

12 Claims, 4 Drawing Sheets

(58) Field of Classification Search
CPC .......... B23Q 1/70; B23Q 1/706; B23Q 1/766;
B23Q 3/00; B23Q 3/06; B23Q 3/062;
B23Q 3/064; B23Q 7/04; B23Q 7/043;
B23Q 7/048; B25B 1/20; B25B 5/04;
B25B 5/14; Y10T 409/30868; Y10T
409/309016; Y10T 82/2593
See application file for complete search history.

(56) References Cited

U.S. PATENT DOCUMENTS

2010/0264121 A1   10/2010  Dilger et al.
2014/0255129 A1*  9/2014  Kenner ................. B23B 13/123
                                                      414/14

FOREIGN PATENT DOCUMENTS

EP         1002622 A2    5/2000
EP         2017023 A1    1/2009

\* cited by examiner

SUPPORT DEVICE, MACHINE TOOL AND METHOD FOR SUPPORTING A ROD-SHAPED WORKPIECE

The invention relates to a support device for supporting a rod-shaped workpiece for a machine tool, a machine tool and a method for supporting a rod-shaped workpiece. In particular, the invention concerns a component for a machine tool as defined in claim 1, a machine tool as defined in claim 10 and a method for supporting a rod-shaped workpiece as defined in claim 11.

A machine tool is used to machine workpieces. For example, tube metal working machines, especially laser cutting machines are regarded as machine tools. Further, bending machines or presses such as pressbrakes, are regarded as machine tools.

EP 1 002 622 B1 discloses supporting a profile such as a tube through holders that enclose the profile laterally and, appropriately shaped, leave a circular room between them equal to the circumference circumscribed to the processed profile. The radii of this circumference can be fixed, variable or fixed sectors. The supports are always wrapped around tube and need to be opened for unloading and loading the profile.

EP 2 017 023 A1 and ITMI2005A001693 disclose a profile supported by one or more supports that include a rest which receives the semi-circumference of the circumscribed profile and supports it in the direction of gravity. The supports have a variable section rest so it can be adapted to different radii by rotating around a horizontal axis transverse to the bar.

The invention is now based on the task of avoiding the disadvantages of the state of the art and providing an improved component for a machine tool, an improved machine tool or an improved method for supporting a rod-shaped workpiece or for loading a rod shaped workpiece into a machine tool.

This task is solved by a component support device for a machine tool according to claim 1, a machine tool according to claim 10 or a method for supporting a rod-shaped workpiece according to claim 11.

The inventive support device for supporting a rod-shaped workpiece for a machine tool along a longitudinal axis of a support area comprises at least one twin support adapted to support a section of the workpiece in the support area, wherein the twin support comprises two support elements each being rotatable around a rotational axis, wherein each of the rotational axes is perpendicular to the longitudinal axis, wherein each support element comprises a quadrant shaped support surface forming together a semicircular shaped support surface adapted for supporting a section of the workpiece, wherein the support area comprises an open side opposed to the semicircular shaped support surface, and wherein the support elements are adapted to provide a varying diameter of the semicircular shaped support surface based upon the position of rotation around the rotational axes in order to support varying workpieces. As the inventive support device comprises an open side, rod-shaped or elongated workpieces may be placed between the support elements by loading from this open end.

In the support device, the longitudinal axis of the support area may coincide with the longitudinal axis of the machine tool when the support device is located in a machining position in which the machine tool machines the workpiece. The longitudinal axis may be oriented horizontally and the rotational axes of the support elements may be oriented vertically. The support area may be defined as a space above or around the at least one twin support and is provided to receive a rod-shaped workpiece like a tube, a bar or a profile. More than one twin support may be placed along the longitudinal axis. The number of twin supports may depend on the length of the support area or the workpiece.

Each support element may comprise at least two quadrant shaped support surfaces with different radii. By rotating the support element around its rotational axis a specific quadrant shaped support surface can be chosen.

The inventive support device offers the advantage to adjust the radius of the support elements placed side-by-side to manage bars even not perfectly rectilinear but avoid that the full weight of the workpiece is effecting the adjustment movement as it is the case for some of the prior art supports which adjust under the full weight load of the workpiece as it is the case e.g. in EP2508298B1 or IT0001380352. The pairs of supports may be adjusted to the correct size just after the bar is been introduced within them.

These supports may comprise a curvilinear surface with a radius equal to the circle circumscribed to the workpiece in process. These supports may be placed side-by-side to create along the tube axis a rest equal to the semi-circumference to the processed workpiece. This support device is open at the top so that it can be loaded and unloaded without having to move or open the two supports. This open side of the support area includes at least the space above the semicircular shaped support surface and may also include the space above the at least one twin support. In case of more than one twin support, the space between and above the twin supports is also open. Open means that no components of the support device are present in that area, thereby improving handling of the workpieces.

In addition to the possibility of their movement in the Z direction, the support device can be used to manage bars not perfectly rectilinear, closing the pairs of supports to the correct size just after the bar is been introduced within them.

It may be provided that the longitudinal axis is identical for different positions of rotation of the support elements. The fixed position of the longitudinal axis, which may coincide with an axis of rotation, is achieved by the shaped support surfaces and eases handling and machining of the workpiece.

It may be provided that the support elements comprise a cylindrical main body in which the quadrant shaped support surface is provided. By placing two symmetrical support elements side-by-side and rotating them around their vertical axes, they form transit areas with different radii in order to cover different diameters without having to physically replace the support elements.

It may also be provided that the quadrant shaped support surface comprises a spiral profile in form of a logarithmic spiral, preferably comprising an angle between seven and twenty seven degrees, preferably seventeen degrees to the rotational axis. The logarithmic spiral offers due to its geometrical proprieties an always constant angle of contact between the supports and the supported tube. An angle of 17.28 degrees is a good working example. The constant angle of contact and the continuous surfaces improve handling of the workpiece.

It may be provided that the quadrant shaped support surface comprises a spiral profile in particular in form of an Archimedean spiral or a hyperbolic spiral or according to one of the spiral laws of Cornu, Clotois, Fermat or Lituo. These further spiral forms also offer continuous surfaces and thus good contact between the holders and the workpiece.

Further, spiral forms like spiral shaped curves or other forms may be adapted according to specific diameters or contours of a workpiece.

It may also be provided that the quadrant shaped support surface comprises a profile that comprises circular or spiral segments. Due to transitions between the segments the surface may be discontinuous. Such support surface may be easier to provide.

It may be provided that at least two twin supports are mounted along a direction of the longitudinal axis on a manipulator, which is movable in two directions transversal to the longitudinal axis of a support area. The directions of movement may be a direction of height and a transverse direction. This possibility of movement can be used to transfer the workpiece in form of a bar or tube or profile directly from the loading system to the working line without any further device between the loader and the working line or machine tool. The manipulator or manipulators can be controlled by a single movement system or being independent of one another.

It may also be provided that the manipulator is movable from a loading position to a machining position of a machine tool and vice versa. The manipulator provides support and transport at the same time thereby improving the material workflow.

It may also be provided that the manipulator is adapted for measurement of the workpiece. The manipulator or manipulators can also be used for the measurement of the workpiece through a special measuring system because they allow perfect alignment of the workpiece itself. The manipulators do not need a controlled axis for the precise tracking of the workpiece during processing because this is guaranteed by the presence of the supports placed side-by-side.

A machine tool according to the invention is adapted for machining a rod-shaped workpiece and comprises a working head and a support device as described above. The same advantages and modifications as described above apply.

An inventive method for supporting a rod-shaped workpiece for a machine tool, comprises the steps of:

providing, by two support elements of at least one twin support of a support device, a semicircular shaped support surface, loading the workpiece from the top onto the semicircular shaped support surface;

rotating the two support elements to adapt the semicircular shaped support surface to the diameter of the workpiece.

The workpiece is held by gravity between the support elements and can additionally be clamped in between them. Further, the same advantages and modifications as described above apply.

It may be provided that at least two twin supports support different parts of the workpiece along a longitudinal axis and transport the loaded workpiece from a loading position to a machining position of a machine tool in a direction perpendicular to the longitudinal axis. The at least one twin support or the support device provides support and transport at the same time thereby improving the material workflow.

Other preferred arrangements of the invention result from other features mentioned in the dependent claims.

Unless otherwise stated in the individual case, the various embodiments of the invention mentioned in this application may be advantageously combined with each other.

The invention will be explained in the following examples by means of the corresponding drawings.

Figure 1:
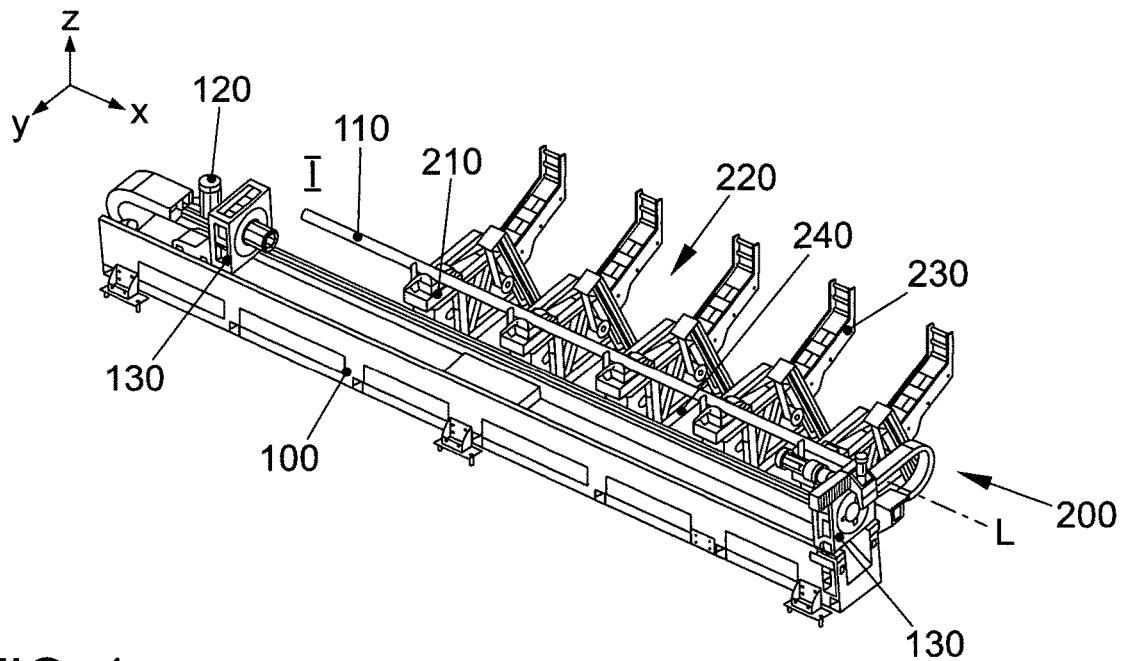
FIG. 1 shows a schematic perspective view of a support device in a loading position.

FIG. 1 shows a machine tool 100 for example a tube metal working machine, especially a laser tube cutting machine. The machine tool 100 is adapted for machining a rod-shaped workpiece 110 (or tube-shaped or tubular workpiece) like a tube and includes a working head 120 with a laser nozzle. The working head 120 cuts the workpiece 110 that is rotatable held between two spindles 130.

Figure 2:
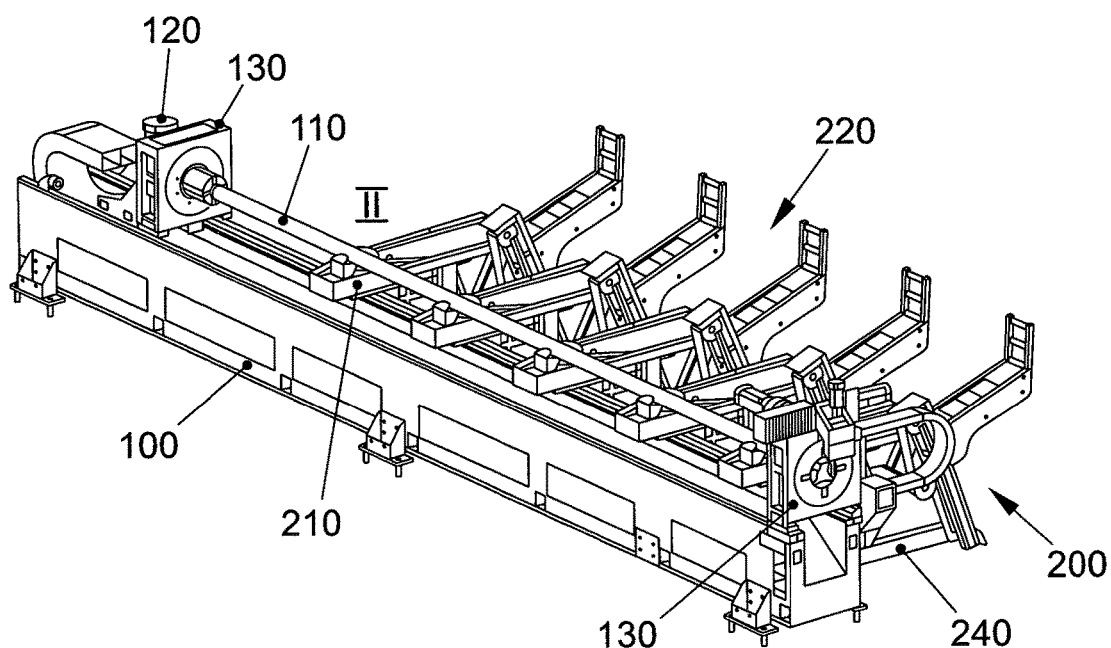
FIG. 2 shows a schematic perspective view of a support device in a machining position.

A support device 200 is provided for supporting the workpiece 110. In FIG. 1, the support device 200 is depicted in a loading position I. In FIG. 2, the support device 200 is depicted in a machining position II. Hence, the support device 200 is adapted to support workpieces 110 while they are machined by the machine tool 100 and/or to load workpieces 110 into the machine tool 100. The support device 200 may be an independent device or form part of the machine tool 100.

The support device 200 includes at least one twin support 210 adapted to support a section of the workpiece 110. In this specific example, five twin supports 210 are present. A support area 220 is defined around the twin supports 210 adapted to receive the workpiece 110. The support area 220 has a longitudinal axis L that extends in a horizontal direction denoted with x in FIG. 1. A longitudinal axis of the workpiece 110 is parallel to or coincides with the longitudinal axis L of the support area 220.

An optional feeder mechanism 230 receives a workpiece 110 from an external loading or conveying mechanism and loads the workpiece 110 from the top into the twin supports 210. The optional feeder mechanism 230 may be a single device or part of the support device 200.

The support device 200 may include a manipulator 240 on which the support device 200 is mounted and which is movable in two directions transversal to the longitudinal axis L of the support area 220. One of the two directions is vertical (z) and the other one is horizontal (y). The feeder mechanism 230 may be part of the manipulator 240.

Further, the manipulator 240 may be adapted for measurement of the workpiece 110. A special measuring system may be used for measurement because the support device 200 provides already a perfect alignment of the workpiece 110. The manipulators 240 does not need a controlled axis for the precise tracking of the workpiece 110 during processing because the position is guaranteed by the presence of the twin supports 210.

The manipulator 240 moves the support device 200 with loaded workpiece 110 from the loading position of FIG. 1 to the machining position of FIG. 2. Movement takes place in the y and z direction.

In FIG. 2, machining, e. g. laser cutting, of the workpiece 110 is shown. The support device 200 clamps and moves the workpiece 110 through the spindles 130 during the machining.

After the machining, the machined workpiece 110 can be transported by a further mechanism or by the support device 200.

Figure 3:
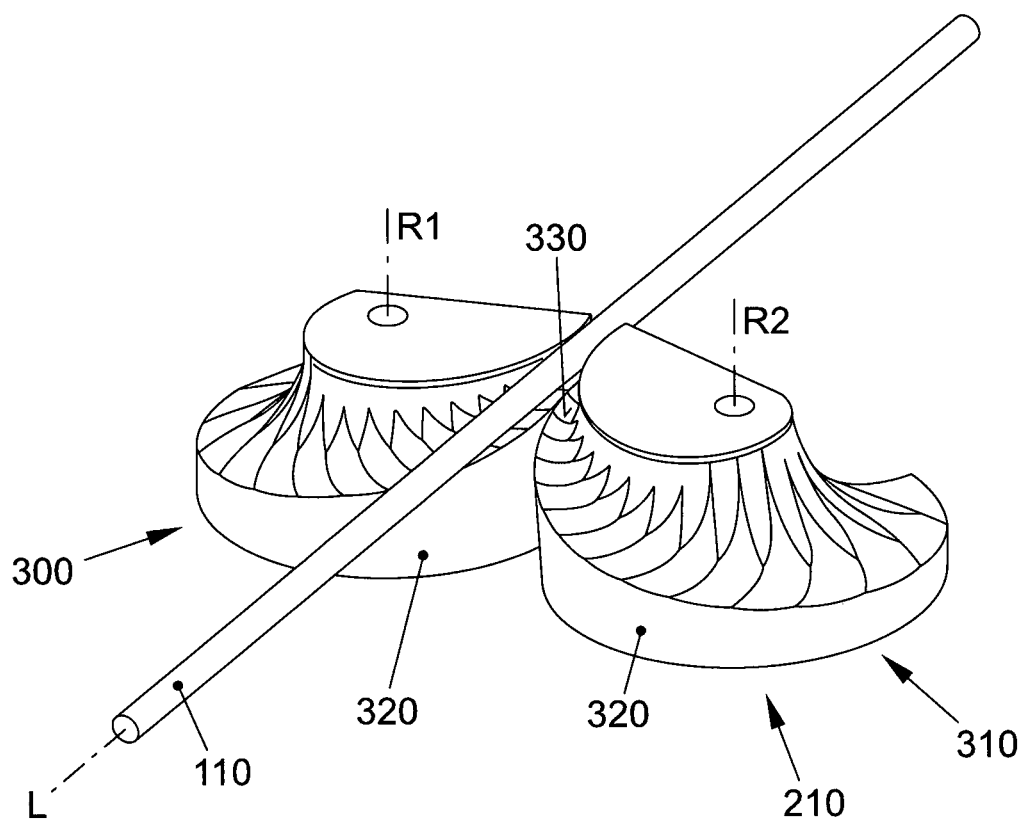
FIG. 3 shows a schematic perspective view of a support device holding a small tube.
Figure 4:
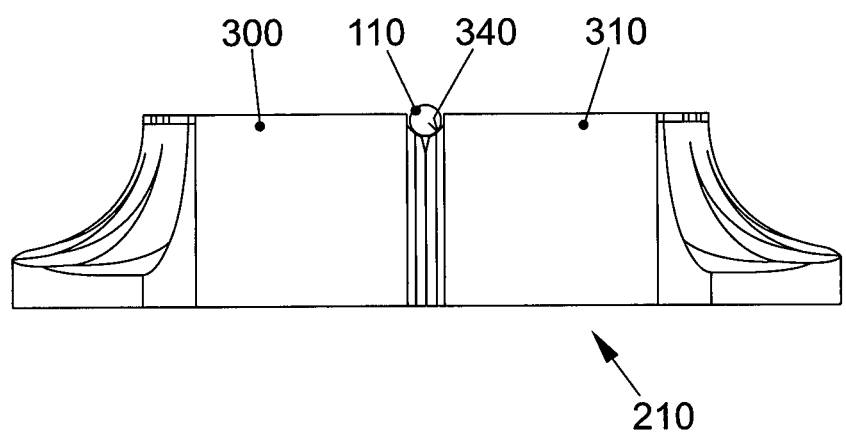
FIG. 4 shows a schematic front view of the support device holding a small tube.

FIGS. 3 and 4 show the twin support 210 of the support device 200 holding a workpiece 110 in greater detail.

The twin support 210 includes two support elements 300, 310 each being rotatable around one of rotational axes R1 and R2, which is perpendicular to the longitudinal axis L. In the specific example, the rotational axes R1, R2 are orientated vertical. The two support elements 300, 310 are arranged as a symmetric pair opposed to each other with regard to the longitudinal axis L. Hence, the two support elements 300, 310 are symmetric with regard to a vertical plane through the longitudinal axis L.

Each support element 300, 310 has a cylindrical main body 320 in which quadrant shaped support surfaces 330 are provided. The quadrant shaped support surfaces 330 of both support elements 300, 310 together form a semicircular shaped support surface 340 (FIG. 4) adapted for supporting a section of the workpiece 110. The semicircular shaped support surface 340 may be continuous, i.e. without a gap between the two quadrant shaped support surfaces 330, or discontinuous, i.e. with a gap between the two quadrant shaped support surfaces 330.

The quadrant shaped support surface 330 is provided within a horizontal plane intersecting with one of the rotational axes R1, R2. The semicircular shaped support surface 340 is provided within a horizontal plane intersecting with both rotational axes R1, R2.

The support elements 300, 310 are adapted to provide a varying diameter of the semicircular shaped support surface 330 based upon the position of rotation around the rotational axes R1, R2 in order to support varying workpieces 110. Symmetric and asymmetric workpieces 110 can be supported by rotating both support elements 300, 310 by the same amount. The semi-circular area 340 obtained by the rotation of both support elements 300, 310 recreates a circumscribed circle around the machined profile 110.

The quadrant shaped support surface 330 comprises a spiral profile, here in form of a logarithmic spiral, preferably comprising an angle of contact between the support surface 330 and the supported workpiece 110 between seven and twenty seven degrees, preferably seventeen degrees to the rotational axis. Due to the two quadrant shaped support surfaces 330 the workpiece 110 is supported from the bottom and held or even clamped from the sides.

The spiral profile has a component in the vertical plane and a component in the horizontal plane. As both spiral components are symmetrical in this example, the longitudinal axis L is identical for different positions of rotation of the support elements 300, 310. This also implies that the support device provides the workpieces 110 always at an axis of rotation of the machine tool irrespective of the workpiece's diameter.

The support area above the quadrant shaped support surfaces 330 comprises an open side opposed to the semicircular shaped support surface 340. This way, the support device can be loaded from the top.

Figure 5:
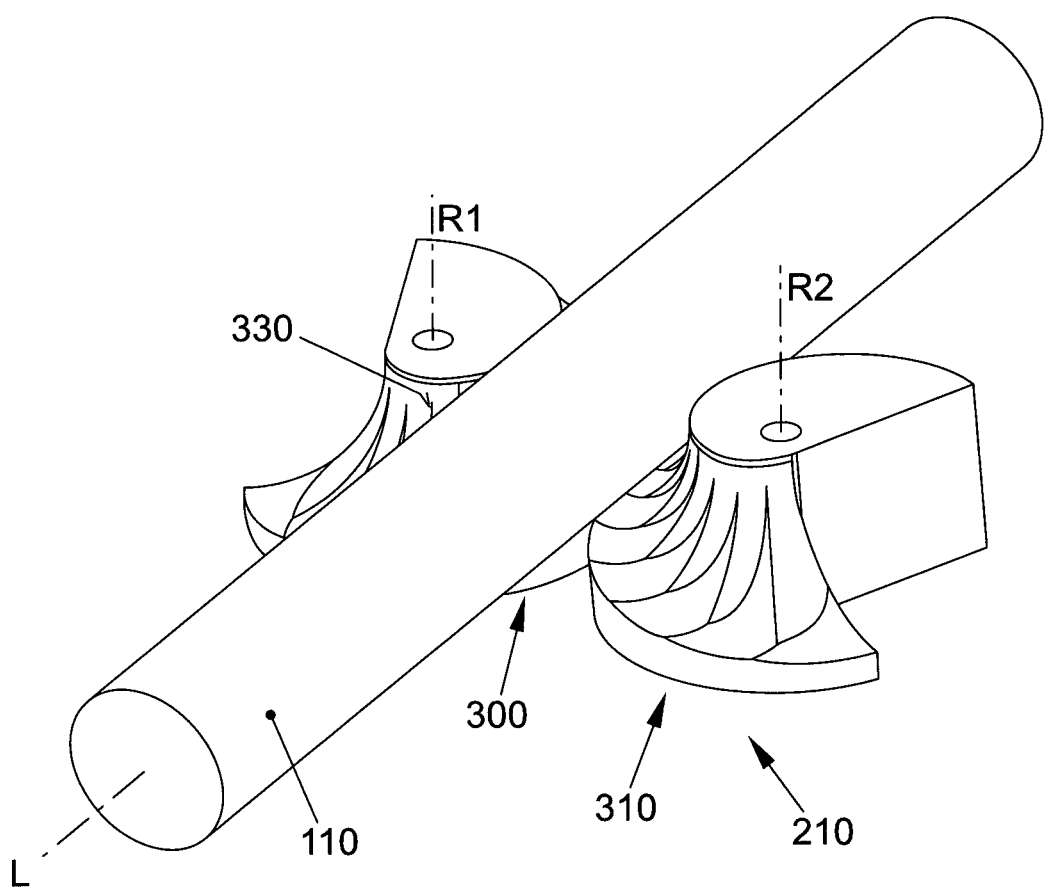
FIG. 5 shows a schematic perspective view of the support device holding a large tube.
Figure 6:
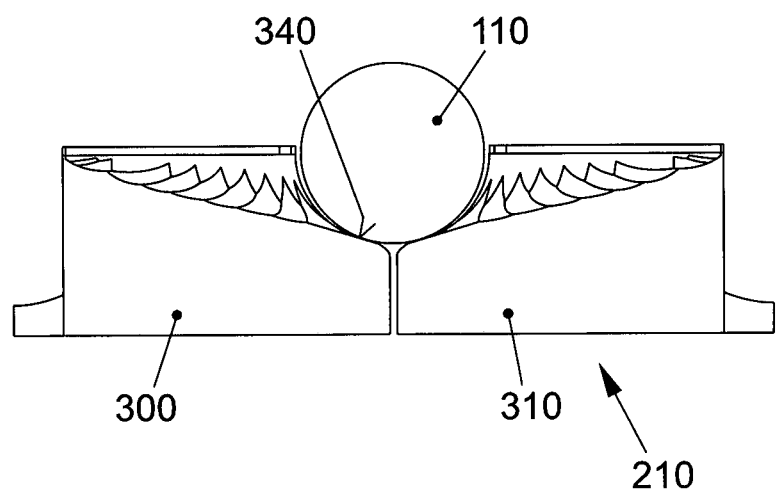
FIG. 6 shows a schematic front view of the support device holding a large tube.

FIGS. 5 and 6 show the twin support 210 of the support device 200 holding a workpiece 110 having a greater diameter compared to FIGS. 3 and 4.

The two support elements 300, 310 have another position with regard to the axes of rotation R1, R2 which results in different active, i.e. actually supporting, semicircular shaped support surface 340. Compared to FIGS. 3 and 4, the semicircular shaped support surface 340 is larger as it is adapted to the increased diameter of the workpiece 110.

In a method for supporting a rod-shaped workpiece 110 for a machine tool, a semicircular shaped support surface 340 is provided by two support elements 300, 310 of at least one twin support 210 of a support device 200.

The workpiece 110 is loaded from the top onto the semicircular shaped support surface 340 and the two support elements 300, 310 are rotated to adapt the semicircular shaped support surface 340 to the diameter of the workpiece 110. By that rotation, the workpiece 110 is supported and held or clamped.

The at least one twin support 210 or the support device 200 transports the loaded workpiece 110 to a machining position of a machine tool. In that position, the workpiece 110 is machined by the machine tool. The support device 200 may move the workpiece 110 during machining.

Figure 7:
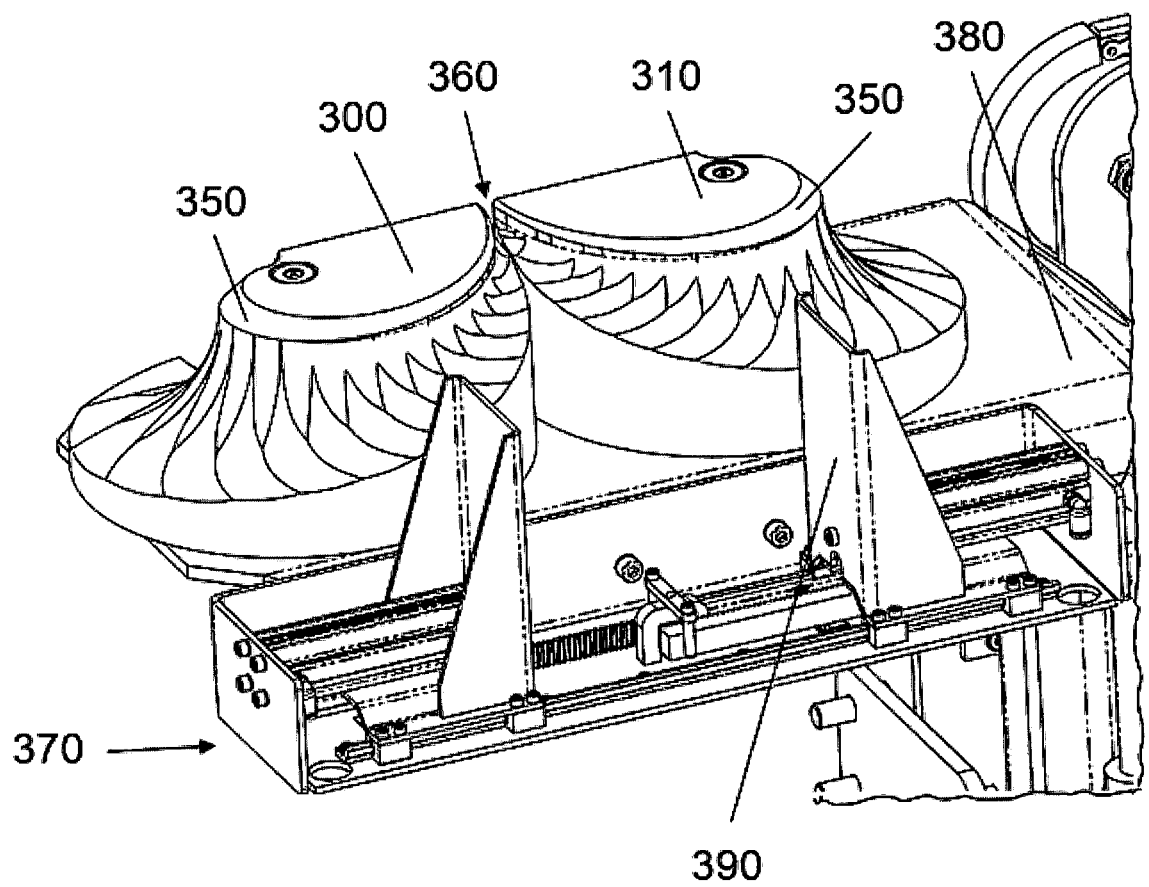
FIG. 7 shows a schematic perspective view of the support device.

FIG. 7 shows a further schematic perspective view of the support device.

In some embodiments, it may be advantageous that the body of the twin spiral supports 300, 310 has a beveled edge 350 in the upper part.

Such beveled edge 350 can prevent a collision which may be generated between the face of the square/rectangular section and the upper sharp edge of the twin spiral supports 300, 310. Such collision could lead to geometric defects found on the cut geometries and excessive wear of the supports themselves. This chamfer or beveled edge 350 helps the support of the tube or profile, in particular if it has a square/rectangular section.

This beveled edge 350 allows the tube or profile to enter the seat 360 formed by the two twin spiral supports 300, 310 even if, due to the effect of the rotation or for its flexibility, it is not locally centered in the twin supports 300, 310. The geometry of the chamfer can be either linear with different degrees of inclination or rounded.

The chamfer can be made on both twin supports. The chamfer can be made on all the pairs of twin supports present in the machine.

In some embodiments, it may be useful to use a holding vise 370 to keep the tube or profile in position during translation from the load area to the work area.

During the movement of the manipulators 380, it may happen that the tube moves out of the seat 360 formed by the two twin spiral supports 300, 310, in particular during the starting and stopping transients of the movement.

It has been verified that a square or rectangular section tube is inclined to rotate inside the seat 360 of the spiral supports 300, 310 in a manner not controlled and unwanted by the loading system. This can lead to an imprecise load on the machine's working line due to an incorrect grip between the spindles.

The holding vice 370 is mounted on the manipulator body 380 so as to be rigidly constrained to it. The two jaws 390 of the holding vice move on an axis transverse to the longitudinal axis of the tube or profile being processed and parallel to the direction of translation of the manipulators 380.

The holding vice 370 closes on the tube before the manipulators move, holding it firmly so that it does not rotate and does not move out of the seat 360 of the spiral supports. The vice 370 releases the tube once it is blocked by the spindles on the working line.

During normal use of the machine, it neither intervenes nor hinders the work of the twin spiral supports 300, 310. Both pneumatic, hydraulic and electric actuators can operate the holding vice 370.

The holding vice 370 can be self-centering. The holding vice 370 can be designed according to different kinematic solutions. The holding vice 370 can be mounted on at least one of the manipulators that the machine is supplied with.

The support device presented here allows a simple and precise support of a rod-shaped workpiece, so that the workpiece can be easily loaded and handled.

The invention claimed is:

1. A support device for supporting a rod-shaped workpiece for a machine tool along a longitudinal axis (L) of a support area, comprising at least one twin support adapted to support a section of the workpiece in the support area, wherein the twin support comprises two support elements each being rotatable around a rotational axis (R1, R2), wherein each of the rotational axes (R1, R2) is perpendicular to the longitudinal axis (L), wherein each support element comprises a quadrant shaped support surface forming together a semicircular shaped support surface adapted for supporting a section of the workpiece, wherein the support area comprises an open side opposed to the semicircular shaped support surface, and wherein the support elements are adapted to provide a varying diameter of the semicircular shaped support surface based upon the position of rotation around the rotational axes (R1, R2) in order to support varying workpieces.

2. The support device according to claim 1, wherein the longitudinal axis (L) is identical for different positions of rotation of the support elements.

3. The support device according to claim 1, wherein the support elements comprise a cylindrical main body in which the quadrant shaped support surface is provided.

4. The support device according to claim 1, wherein the quadrant shaped support surface comprises a spiral profile in form of a logarithmic spiral, preferably comprising an angle between seven and twenty seven degrees, preferably seventeen degrees to the rotational axis (R1, R2).

5. The support device according to claim 1, wherein the quadrant shaped support surface comprises a spiral profile in particular in form of an Archimedean spiral or a hyperbolic spiral or according to one of the spiral laws of Comu, Clotois, Fermat or Lituo.

6. The support device according to claim 1, wherein the quadrant shaped support surface comprises a profile that comprises circular or spiral segments.

7. The support device according to claim 1, wherein at least two twin supports are mounted along a direction of the longitudinal axis (L) on a manipulator, which is movable in two directions transversal to the longitudinal axis (L) of a support area.

8. The support device according to claim 1, wherein the manipulator is movable from a loading position (I) to a machining position (II) of a machine tool and vice versa.

9. The support device according to claim 8, wherein the manipulator is adapted for measurement of the workpiece.

10. A machine adapted for machining a rod-shaped workpiece, comprising a working head and a support device according to claim 1.

11. A method for supporting a rod-shaped workpiece for a machine tool, comprising the steps of:

providing, by two support elements of at least one twin support of a support device, a semicircular shaped support surface;

loading the workpiece from the top onto the semicircular shaped support surface; and rotating the two support elements to adapt the semicircular shaped support surface to the diameter of the workpiece.

12. The method according to claim 11, wherein at least two twin supports support different parts of the workpiece along a longitudinal axis (L) and transport the loaded workpiece from a loading position (I) to a machining position (II) of a machine tool in a direction perpendicular to the longitudinal axis (L).

* * * * *